US007410137B2

(12) United States Patent
Diggle et al.

(10) Patent No.: US 7,410,137 B2
(45) Date of Patent: Aug. 12, 2008

(54) SUPPORT DEVICE

(75) Inventors: Fred Diggle, Mountain Brook, AL (US); Knox Faulkner, Stessett, AL (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 992 days.

(21) Appl. No.: 10/643,177

(22) Filed: Aug. 18, 2003

(65) Prior Publication Data

US 2005/0040303 A1 Feb. 24, 2005

(51) Int. Cl.
*F16M 13/00* (2006.01)

(52) U.S. Cl. ......................... 248/246; 248/71; 248/211; 411/71; 411/400; 411/401

(58) Field of Classification Search ..................... 211/5; 248/551, 303, 552, 333, 323, 331, 495, 546, 248/71; D8/370; 411/55, 80.6, 71, 90, 400, 411/401

See application file for complete search history.

(56) References Cited

U.S. PATENT DOCUMENTS

| | | | |
|---|---|---|---|
| 83,913 A | 11/1868 | Bradley | |
| RE9,440 E | 11/1880 | Judd | |
| 279,113 A | 6/1883 | Clow | |
| 304,618 A | 9/1884 | Cullen | |
| 306,874 A | 10/1884 | Thatcher | |
| 350,209 A * | 10/1886 | Parmelee | 411/400 |
| 415,181 A | 11/1889 | Wilcox | |
| 427,642 A | 5/1890 | Wack | |
| 472,948 A | 4/1892 | Gorton | |
| 479,058 A | 7/1892 | Corscaden | |
| 543,121 A | 7/1895 | Bates | |
| 0,543,121 A | 7/1895 | Bates | |
| 601,849 A | 4/1898 | Aiken | |
| 682,753 A | 9/1901 | Teele | |
| 908,320 A | 12/1908 | Page | |
| 975,235 A | 11/1910 | Hansen | |
| 1,057,448 A | 4/1913 | Nordstrom | |
| 1,242,122 A | 10/1917 | Apel | |
| 1,313,795 A | 8/1919 | Davis | |
| 1,491,203 A | 4/1924 | Enoch | |
| 1,518,900 A | 12/1924 | Colbert | |
| 1,610,082 A | 12/1926 | Francis | |
| 1,736,707 A | 11/1929 | Lake | |
| 1,779,339 A | 10/1930 | Sokoloff | |
| 1,798,468 A | 3/1931 | Hartzler | |
| 1,953,860 A | 4/1934 | Kraatz | |
| 2,043,716 A | 6/1936 | Sloan | |
| 2,188,084 A | 1/1940 | Kuckuck | |

(Continued)

OTHER PUBLICATIONS

U.S. Appl. No. 10/646,204, filed Aug. 22, 2003.

(Continued)

*Primary Examiner*—Amy J. Sterling
(74) *Attorney, Agent, or Firm*—Scott P. Zimmerman, PLLC

(57) ABSTRACT

A support device is disclosed for supporting an article. The device has a shank having a first and a second end. The first end may be driven into a member for securing the shank therein. A first and a second support member outwardly extend from the shank. The first and the second support member support the article when attached to or suspended from at least one of the first and the second support member.

7 Claims, 11 Drawing Sheets

U.S. PATENT DOCUMENTS

| | | | | |
|---|---|---|---|---|
| 2,257,640 | A | 9/1941 | Muller | |
| 2,307,348 | A | 1/1943 | Anderson | |
| 2,697,857 | A | 12/1954 | Eckel | |
| 3,061,835 | A | 11/1962 | Hain | |
| 3,088,361 | A | 5/1963 | Lay | |
| 3,092,412 | A * | 6/1963 | Drake | 294/66.1 |
| 3,178,971 | A | 4/1965 | Bachli | |
| 3,298,459 | A | 1/1967 | Bergsten | |
| 3,341,651 | A | 9/1967 | Odegaard | |
| 3,483,790 | A | 12/1969 | Matthews | |
| 3,515,363 | A * | 6/1970 | Fisher | 248/71 |
| 3,690,536 | A | 9/1972 | Bakoiedis | |
| 3,848,080 | A | 11/1974 | Schmidt | |
| 3,934,802 | A | 1/1976 | Jennings | |
| 4,018,023 | A | 4/1977 | Anderson | |
| 4,068,790 | A | 1/1978 | Osterle | |
| 4,157,001 | A | 6/1979 | Pickles | |
| 4,289,058 | A | 9/1981 | Paskert | |
| 4,413,706 | A | 11/1983 | Michael | |
| 4,438,769 | A | 3/1984 | Pratt | |
| 4,449,612 | A | 5/1984 | Southard | |
| 4,479,599 | A | 10/1984 | Conrad | |
| 4,655,380 | A | 4/1987 | Haytayan | |
| 4,655,423 | A | 4/1987 | Schavilje | |
| 4,697,669 | A | 10/1987 | Bergsten | |
| 4,830,254 | A | 5/1989 | Hsu | |
| 4,940,271 | A * | 7/1990 | Steffes | 294/1.1 |
| 4,979,858 | A | 12/1990 | Van Allman et al. | |
| 5,062,753 | A | 11/1991 | Begue | |
| 5,135,150 | A | 8/1992 | Chun | |
| 5,207,404 | A | 5/1993 | Reinhard | |
| 5,269,450 | A | 12/1993 | Popvich et al. | |
| 5,279,388 | A | 1/1994 | Laughlin | |
| 5,417,534 | A | 5/1995 | Losada | |
| 5,513,935 | A | 5/1996 | Sharber | |
| 5,549,234 | A | 8/1996 | Hong | |
| 5,606,832 | A | 3/1997 | Keith | |
| 5,624,007 | A | 4/1997 | Mahaffy | |
| 5,881,837 | A | 3/1999 | Leicht | |
| 5,887,677 | A | 3/1999 | Malmgren | |
| 5,899,124 | A | 5/1999 | Cross, Jr. | |
| 5,944,139 | A | 8/1999 | Kozial | |
| 5,967,475 | A | 10/1999 | Johnson | |
| 6,126,055 | A | 10/2000 | Ganter et al. | |
| 6,439,343 | B1 | 8/2002 | Jorges et al. | |
| 6,484,888 | B2 | 11/2002 | Miller | |
| 6,585,142 | B1 | 7/2003 | Chen | |
| 6,726,162 | B1 | 4/2004 | Winter | |
| 6,729,437 | B1 | 5/2004 | Apple | |
| 6,872,042 | B2 | 3/2005 | Panasik et al. | |
| 6,918,222 | B2 | 7/2005 | Lat | |
| 7,077,612 | B1 * | 7/2006 | Diggle et al. | 411/400 |
| 2002/0098062 | A1 | 7/2002 | Beale | |
| 2002/0121406 | A1 | 9/2002 | Summers | |
| 2003/0140739 | A1 | 7/2003 | McKivigan | |
| 2004/0064932 | A1 | 4/2004 | Sprague | |
| 2004/0099300 | A1 | 5/2004 | Warren | |
| 2004/0129496 | A1 | 7/2004 | Clark | |

OTHER PUBLICATIONS

U.S. Appl. No. 10/646,006, filed Aug. 22, 2003.
U.S. Appl. No. 10/646,068, filed Aug. 22, 2003.
U.S. Appl. No. 10/687,151, filed Oct. 16, 2003.

* cited by examiner

SUPPORT DEVICE

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to supports and, more particularly, to a support having a threaded, barbed, and/or tapered shank.

2. Description of the Related Art

In the telecommunications or electronics industry, it is common practice for a technician (also referred to as a "lines-man") to climb a utility pole. The technician climbs the utility pole to install equipment, to repair broken or damaged communications equipment, to test equipment, and/or for other work-related reasons. In order to safely and effectively climb a pole and perform line work, the technician must maintain and properly utilize various types of climbing equipment. To utilize the various types of climbing equipment, the technician must also have the skills and the physical ability to sustain a great strain on their legs and back while the technician climbs and/or maintains a position about the pole.

Conventional climbing equipment employed by a technician typically includes a pair of gaffs, a body belt, and/or a safety strap. In general, the gaff is a sharp blade protruding from the inside of the foot about mid-foot level and having straps that secure about the leg and/or feet of a technician. To climb, the technician drives one of the gaffs into the pole, steps up onto the gaff, and then drives the other gaff into the pole at a higher position. The technician continues taking steps up or "gaffs up" the pole until reaching a desired height.

The body belt is secured around the waist of the technician. The body belt includes pockets for carrying tools and rings (e.g., "D-rings") for attaching the safety strap. The safety strap typically includes a hook (e.g., snap buckle) at each end and a buckle for adjusting its length. During climbing, both hooks of the safety strap are attached to the same ring of the body belt on the left hip. Once in a position to perform line work, the technician releases one end of the safety strap from the body belt. The technician then wraps the safety strap around the pole and reattaches the end of the safety strap to the body belt, thus allowing the technician to use his hands at the desired working elevation. Thus, the technician uses the safety strap for climbing as well as supporting the technician in his working position about the pole.

During elevated line work, both gaffs are pressed into the pole and the technician leans back against the safety strap. This position allows the weight of the technician to be supported by the gaffs and the tension in the safety strap. An error in technique or defect in equipment, however, may result in serious injury to the technician. For example, there are times when a gaff dislodges or "cuts out" from the pole. If one or both of the gaffs cuts out, the technician may (i) fall straight down from atop the pole, (ii) rotate downward and fall on the head, (iii) get one or more gaffs back into the pole, and (iv) may reach out to grab/hug the pole. In many of these scenarios, the technician may, and often does, sustain injury such as to the knees, back, and/or arms.

Safety devices have been proposed for supporting the weight of the technician to prevent accidents as described above; however, the usefulness of such safety devices depends upon the willingness of the technician to use them which in turn relies upon whether such devices are conveniently and easily used in the field. As an alternative to climbing the pole, some technicians resort to using ladders or bucket trucks to perform elevated line work so as to avoid the risk of injury from a fall. This solution requires the purchase and maintenance of additional equipment and, thus, results in increased expenses for the technician's employer. In addition, work related injuries still occur when using and transporting a ladder of the size necessary to reach the top of a pole.

BRIEF SUMMARY OF THE INVENTION

The aforementioned problems are reduced by a support device for supporting one or more articles. This support device is driven into a utility pole or other member, and this support device has multiple features for supporting a technician and/or other articles. The technician, for example, may secure himself/herself to the support device, and the technician may also secure tools or other articles to the support device. The support device of this invention could even support a platform upon which the technician could stand. Should the technician become disabled while atop the utility pole, a pulley could be secured to this support device and the technician could be safely lowered. This support device also remains installed in the utility pole for future use. The support device of this invention, therefore, provides added security and safety when scaling and when working atop the utility pole.

One embodiment of this invention also describes a support device for supporting an article. The device has a shank having a first and a second end. The first end may be driven into a member for securing the shank therein. A first and a second support member outwardly extend from the shank. The first and the second support member support the article when attached to or suspended from at least one of the first and the second support member.

Another embodiment of this invention describes a support device for supporting an article. The support device has a shank having a first and a second end, with the first end being adaptable to be driven into a member for securing the shank therein. A generally hooked-shaped support member outwardly extends from the second end of the shank, and the hook-shaped support member supports the article when attached to or suspended from the hook-shaped support member. A second support member also outwardly extends from the second end of the shank. The second support member has an inner surface forming an enclosure about a hollow inner area. The second support member also supports the article when attached to or suspended from the second support member.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The aforementioned problems, and other problems, are reduced by a support device for supporting one or more articles. This support device is driven into a utility pole or other member, and this support device has multiple features for supporting a technician and/or other articles. The technician, for example, may secure himself/herself to the support device, and the technician may also secure tools or other articles to the support device. The support device of this invention could even support a platform upon which the technician could stand. Should the technician become disabled while atop the utility pole, a pulley could be secured to this support device and the technician could be safely lowered. This support device also remains installed in the utility pole for future use. The support device of this invention, therefore, provides added security and safety when scaling and when working atop the utility pole.

Figure 1:
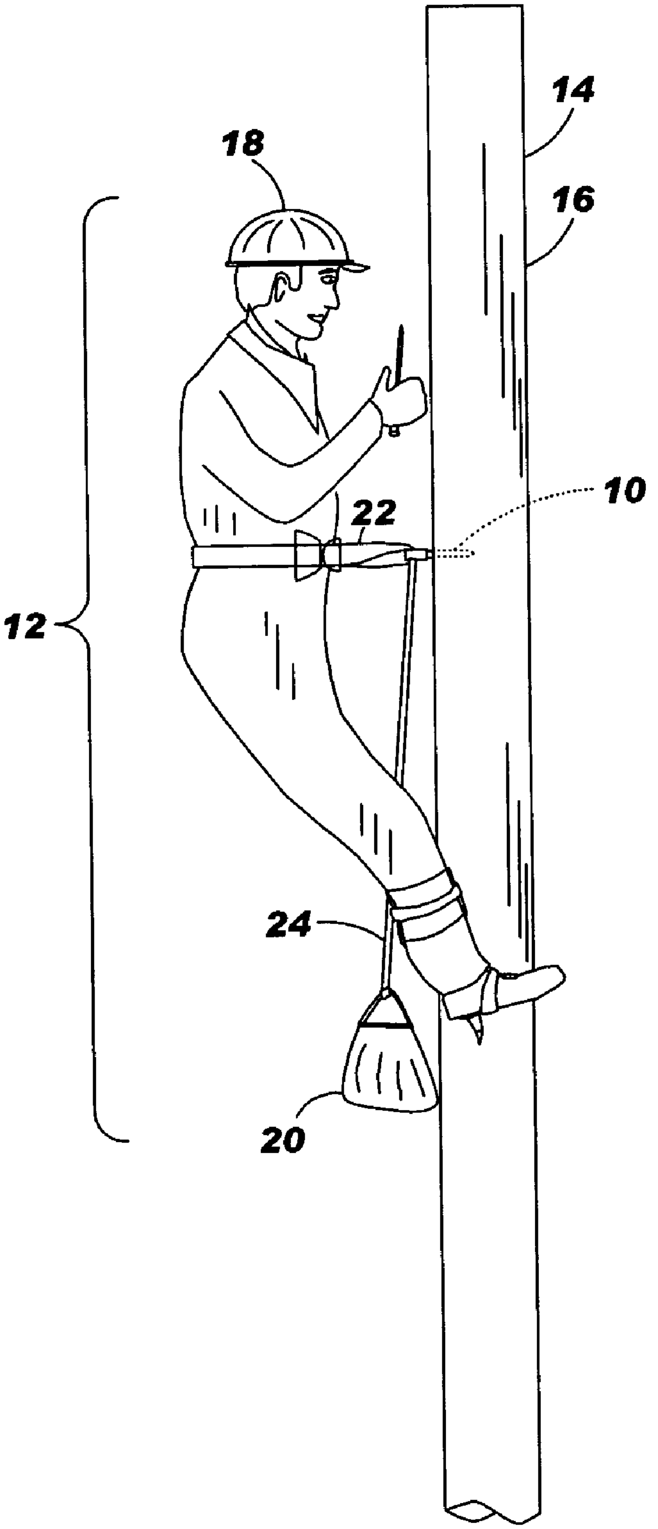
FIGS. 1-3 are schematics showing one of the embodiments of a support device for supporting an article.
Figure 2:
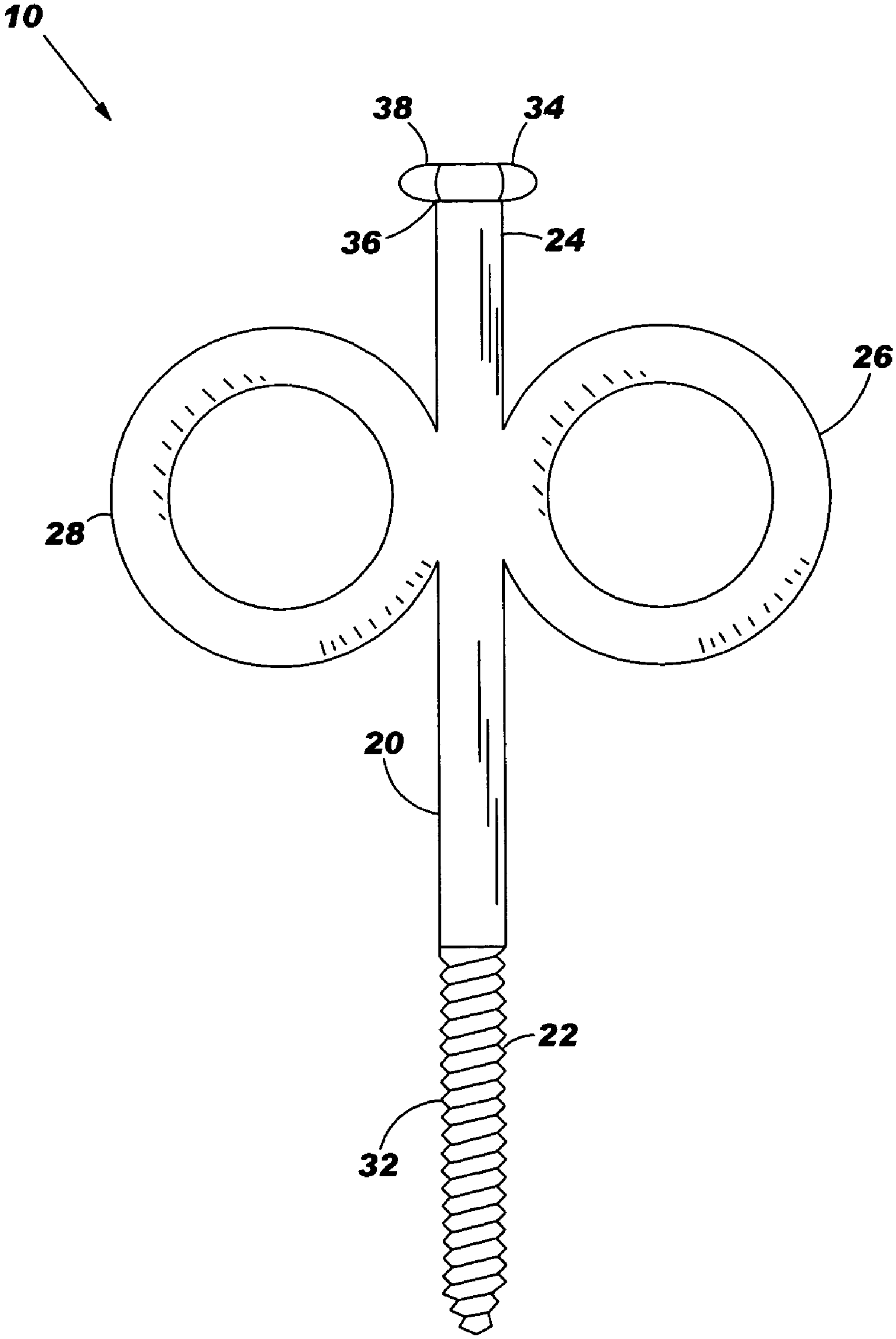
Figure 3:
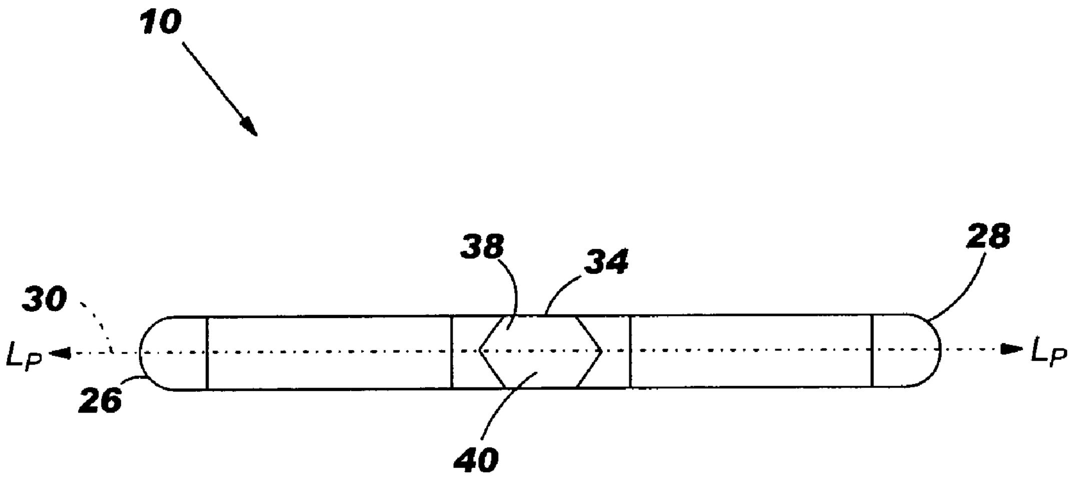

FIGS. 1-3 are schematics showing embodiments of a support device 10 for supporting an article 12. FIG. 1 is a schematic illustrating the support device 10 supporting the article 12 from a member 14. FIG. 2 is a top orthographic view of the support device 10, while FIG. 3 is an end orthographic view of the support device 10. As FIG. 1 shows, the support device 10 is driven into the member 14. The member 14 is shown as a utility pole 16, although the member 14 may be a pole, tree trunk, wall, rock face, or any other colunmar/vertical member. Once the support device 10 is driven into the member 14, the article 12 may be attached to, or suspended from, the support device 10. The support device 10 is capable of supporting multiple articles 12, such as a technician 18 and a tool satchel 20. Line 22 attaches between the support device 10 and the technician 18, while another line 24 attaches between the support device 10 and the tool satchel 20. The support device 10 thus helps secure the technician to prevent a fall, while the support device 10 also supports tools while the technician works.

FIGS. 2 and 3 are additional views of the support device 10. The support device 10 has a shank 20. The shank 20 has a first end 22 and a second end 24. A first support member 26 and a second support member 28 outwardly extend from the shank 20. The shank 20, the first support member 26, and the second support member 28 are preferably aligned along line Lp-Lp (shown as reference numeral 30 in FIG. 3) and, thus, have a coplanar relationship. The shank 20, the first support member 26, and the second support member 28, however, may alternatively have a non-planar relationship. The first end 22 of the shank 20 has a threaded portion 32 for threadably securing the shank 20 into the member (shown as reference numeral 14 in FIG. 1). The shank 20 may also have a head 34 at an extremity 36 of the second end 24. The head 34 may include a polygonally-shaped surface 38 for threadably driving the shank 20 into the member. The polygonally-shaped surface 38 is shown as a hexagonally-shaped head 40 for attachment of a conventional socket (not shown). The support device 10 may thus be threadably driven into the member and remains in the member for subsequent use.

Figure 4:
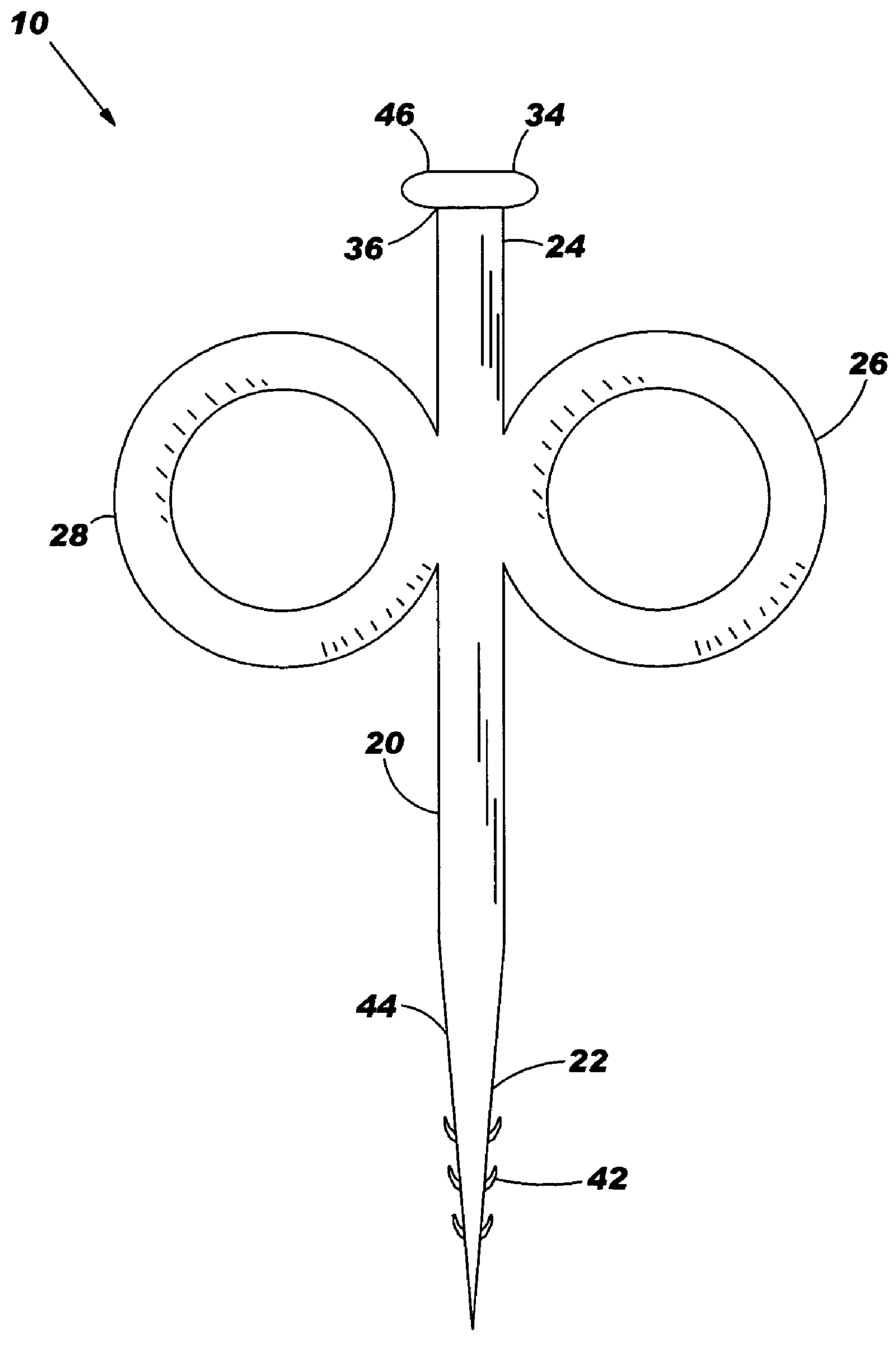
FIG. 4 is a top orthographic view showing another of the embodiments of the support device showing at least one barb protruding from an outer surface.

FIG. 4 is a top orthographic view of more embodiments of the support device 10. Here the first end 22 of the shank 20 has at least one barb 42 protruding from an outer surface 44. The at least one barb 42 helps secure the shank 20 into the member (shown as reference numeral 14 in FIG. 1). The head 34 at the extremity 36 of the second end 24 has a generally flat surface 46 for striking the shank 20 into the member. When the technician (shown as reference numeral 18 in FIG. 1) climbs the member, this embodiment allows the technician to pound, hammer, or strike the support device 10 into the member. The support device 10 then remains in the member for subsequent technicians.

Figure 5:
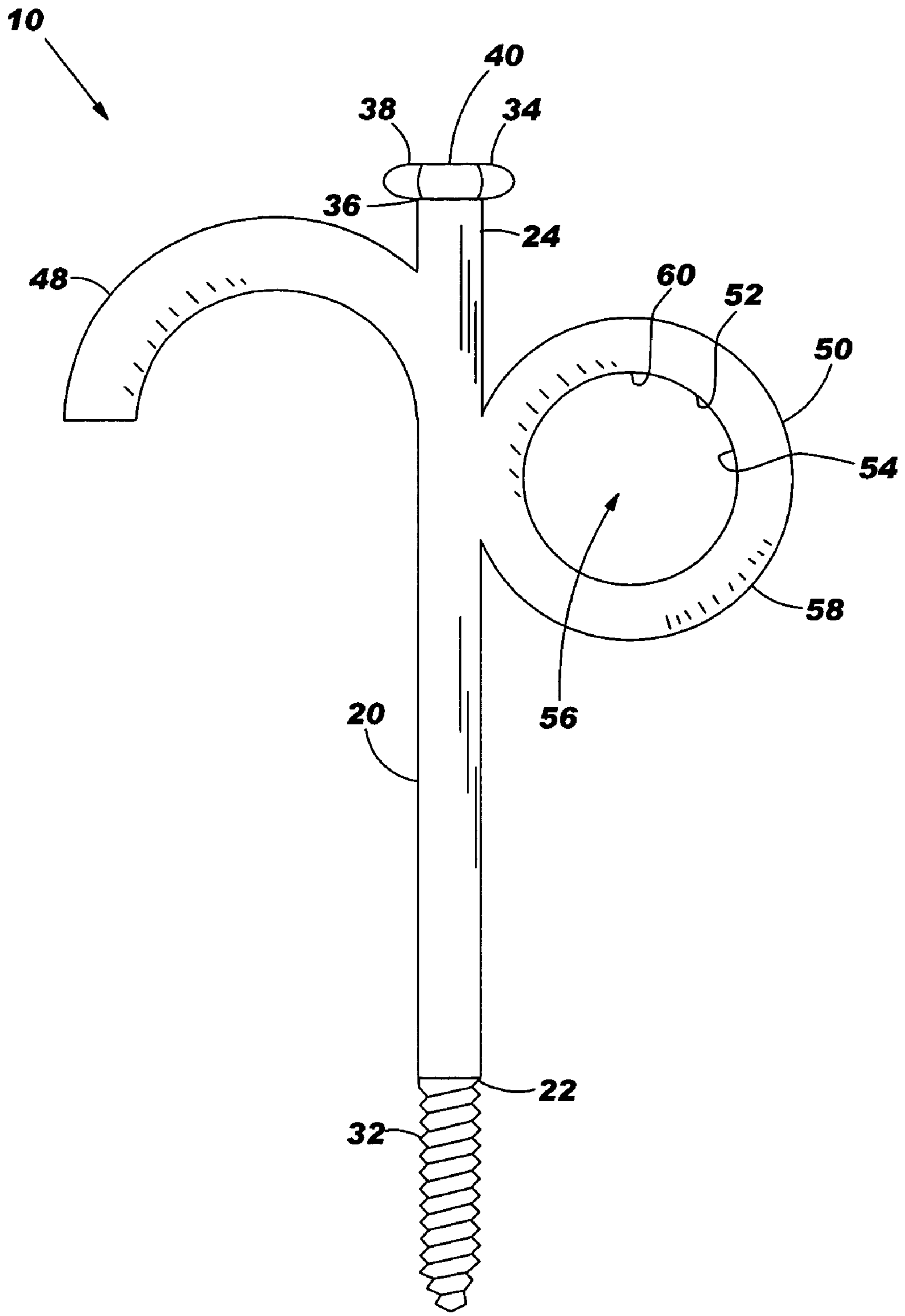
FIG. 5 is a top orthographic view showing another of the embodiments of the support device showing a generally hooked-shaped support and a second support member.

FIG. 5 is a top orthographic view of more embodiments of the support device 10. Here a generally hooked-shaped support member 48 outwardly extends from the second end 24 of the shank 20. The hook-shaped support member 48 may have a generally closed or open configuration for supporting the article (shown as reference numeral 12 in FIG. 1) when attached to or suspended from the hook-shaped support member 48. A second support member 50 also outwardly extends from the second end 24 of the shank 20. The second support member 50 has an inner surface 52 forming an enclosure 54 about a hollow inner area 56. The second support member 50 also supports the article when attached to or suspended from the second support member 50. The shank 20, the hooked-shaped support member 48, and the second support member 50 are aligned along the line $L_P$-$L_P$ (shown as reference numeral 30 in FIG. 3) and, thus, have a coplanar relationship. FIG. 5 shows the second support member 50 having a generally ring shape 58, and the inner surface 52 has a generally circular shape 60 enclosing the hollow inner area 56. The hooked-shaped support member 48 and the ring-shaped second support member 50 provide different levels of authority, depending upon the desired use and load. The first end 22 of the shank 20 may include the threaded portion 32 and/or the head 34 for threadably driving the shank 20 into the member (shown as reference numeral 14 in FIG. 1). The head 34 may include the polygonally-shaped surface 38, such as the hexagonally-shaped head 40, for threadably driving the shank 20 into the member.

Figure 6:
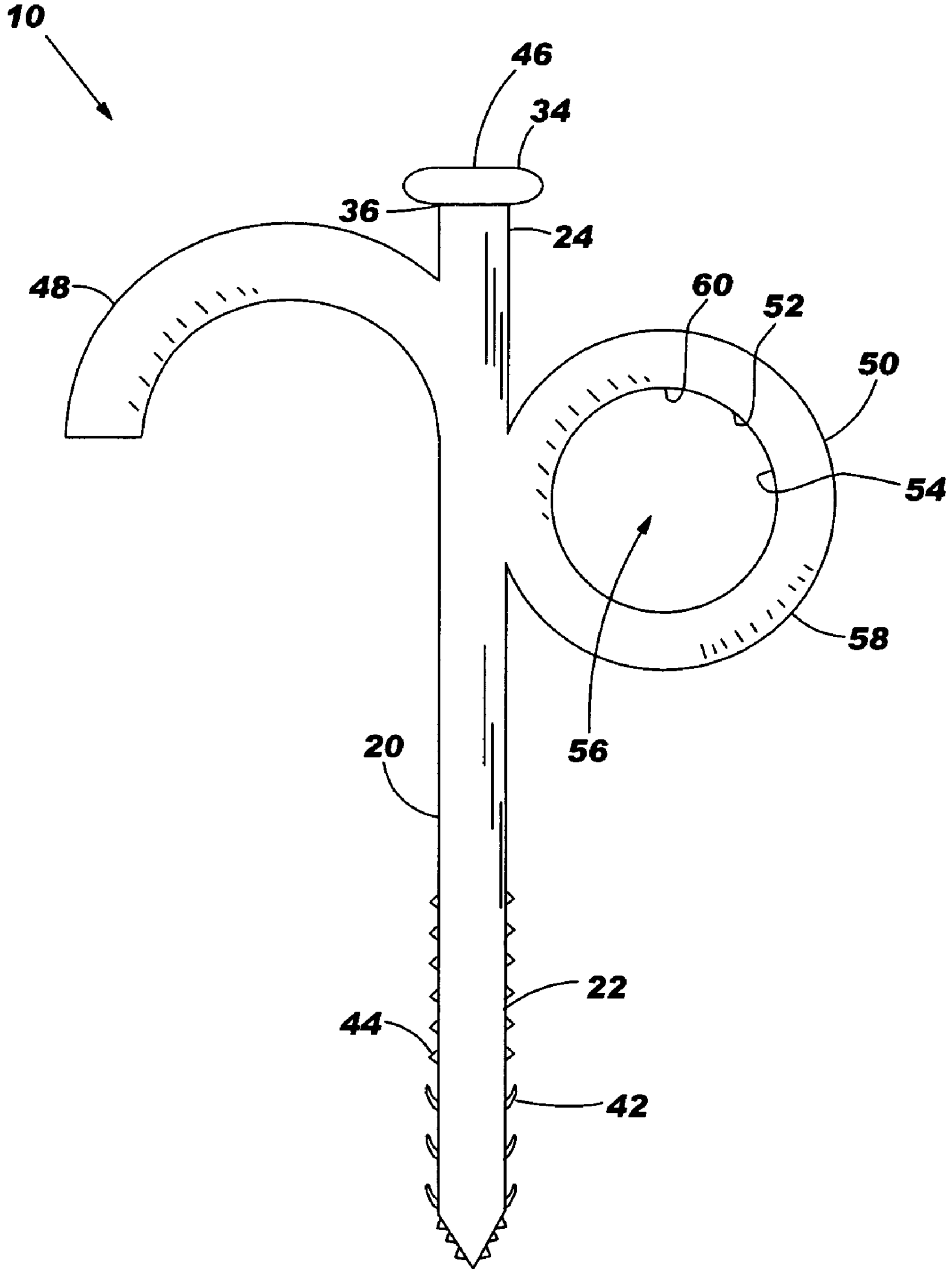
FIG. 6 is a top orthographic view of still more embodiments of the support device.

FIG. 6 is a top orthographic view of still more embodiments of the support device 10. Here the support device 10 is similar to that shown in FIG. 5, however, the first end 22 of the shank 20 includes the at least one barb 42 protruding from the outer surface 44. The at least one barb 42 helps secure the shank 20 into the member (shown as reference numeral 14 in FIG. 1). The head 34 at the extremity 36 of the second end 24 has the generally flat surface 46 for striking the shank 20 into the member.

Figure 7:
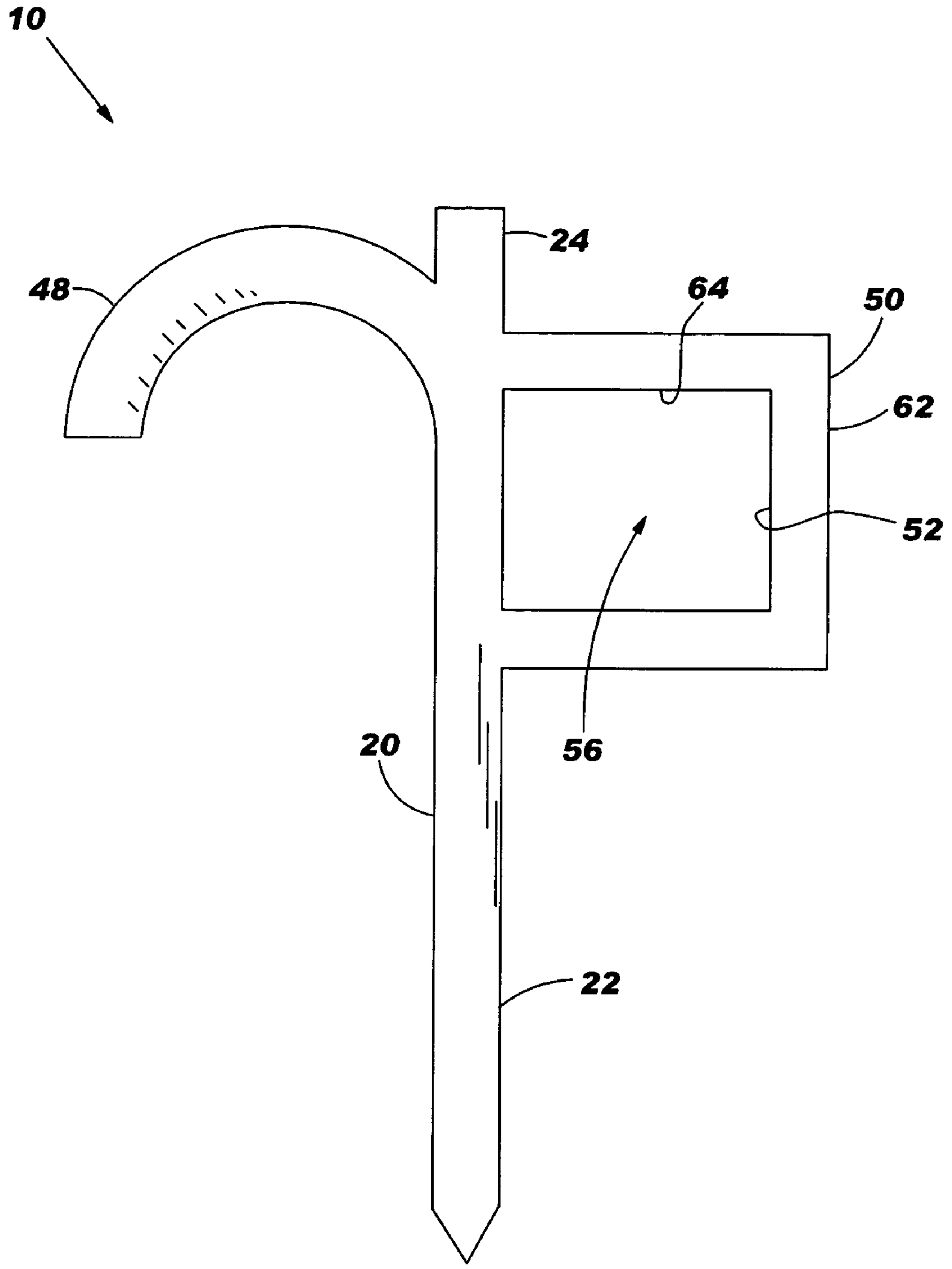
FIG. 7 is a top orthographic view of still more embodiments of the support device having a generally square shaped feature.
Figure 8:
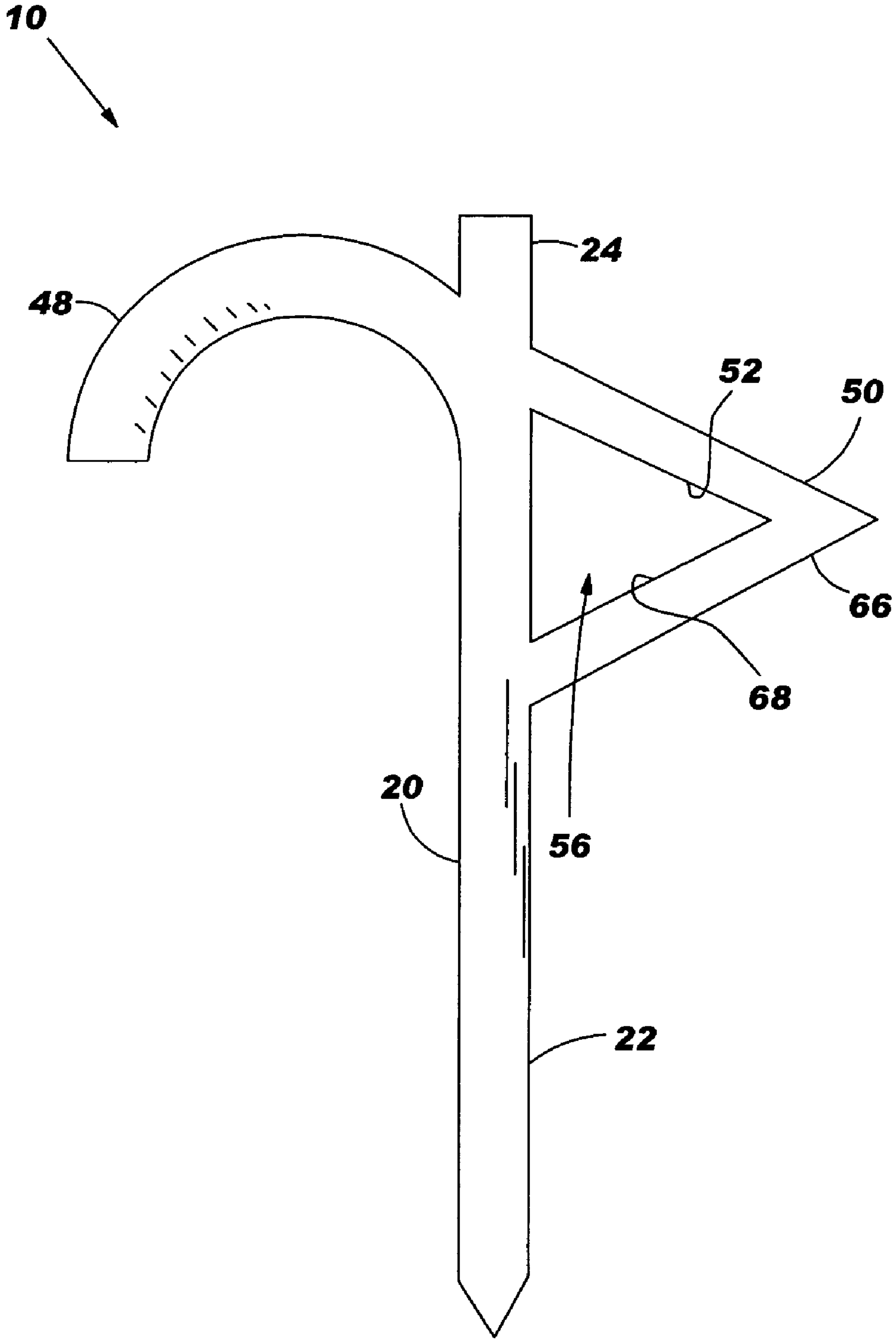
FIG. 8 is a top orthographic view of still more embodiments of the support device having a generally triangular shaped feature.

FIGS. 7 and 8 are top orthographic views of still more embodiments of the support device 10. FIG. 7 shows the second support member 50 having a generally square shape 62, and the inner surface 52 has a generally square shape 64 enclosing the hollow inner area 56. FIG. 8, on the other hand, shows the second support member 50 having a generally triangular shape 66, and the inner surface 52 has a generally triangular shape 68 enclosing the hollow inner area 56. Those of ordinary skill in the art now recognize the second support member 50, and the inner surface 52, may have any shape to suit the application or use. The second support member 50 and the inner surface 52 may even have dissimilar shapes if the application or use requires.

The embodiments shown in FIGS. 1-8 may be constructed using any means or process. The support device 10 is preferably stamped or pressed from metal material as an integral, single piece device. The support device 10 may alternatively be welded or cast from metal material. The metal material may have any composition, any cold/heat treatment, or any quenching. The metal material may have any rust inhibitor and/or sacrificial coating to reduce corrosion. The support device 10 could alternatively be formed from composite material(s), polymer material(s), and other appropriate materials if the application warrants.

Figure 9:
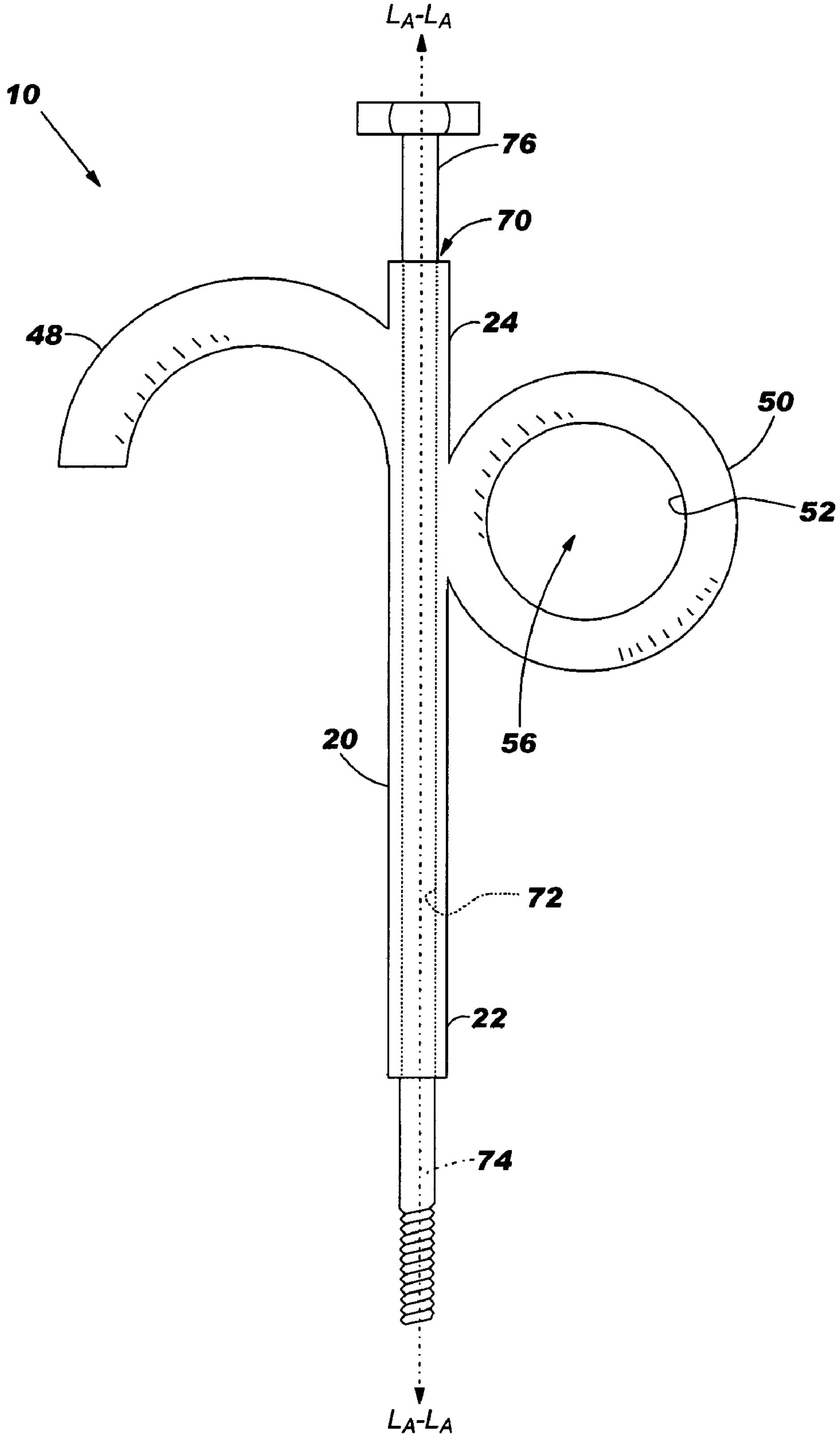
FIGS. 9 and 10 are schematics illustrating yet more embodiments of the support device.
Figure 10:
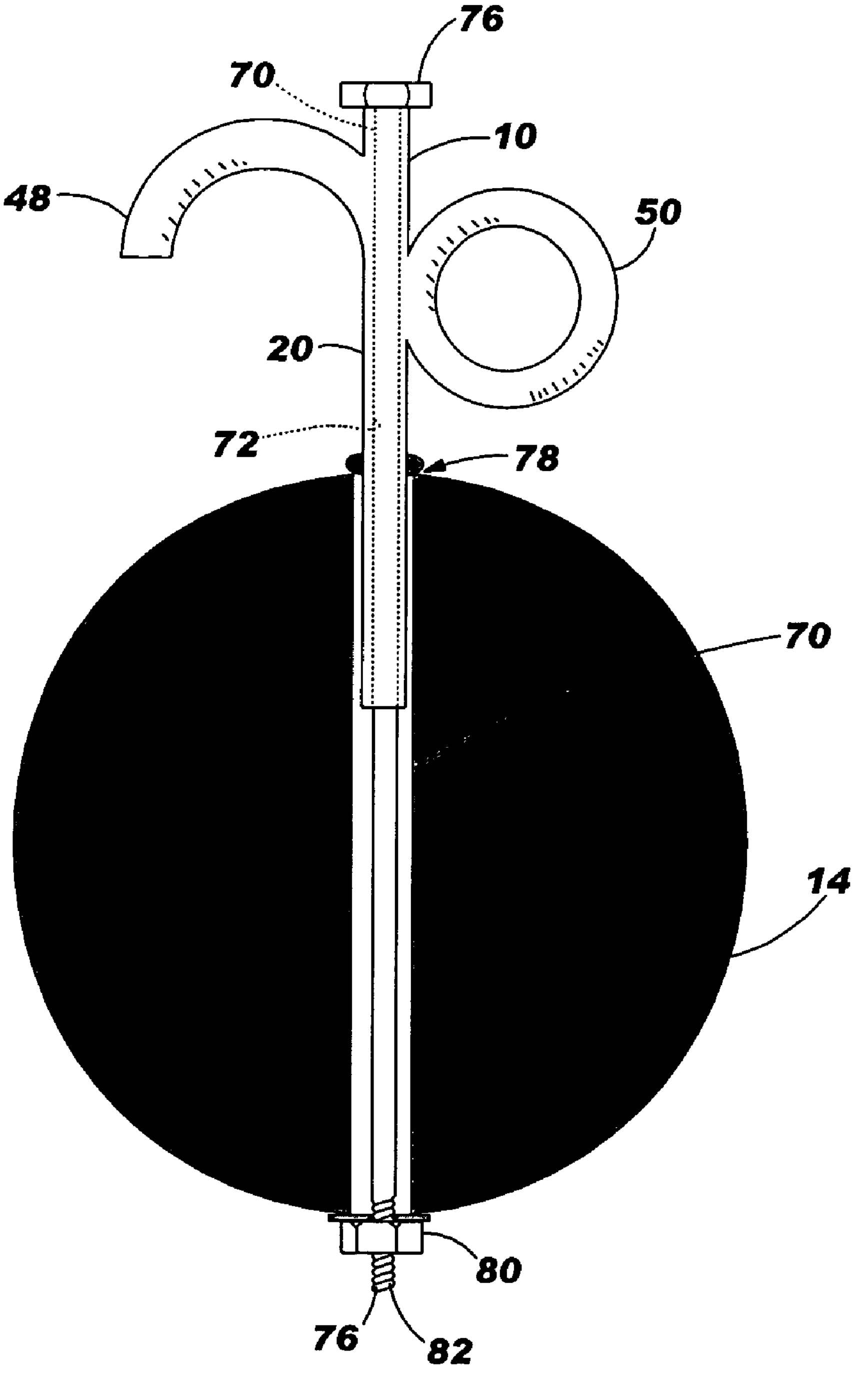

FIGS. 9 and 10 are schematics illustrating more embodiments of the support device 10. FIG. 9 is a top orthographic view of these embodiments, while FIG. 10 is a schematic showing these embodiments installed within the member 14. These embodiments of the support device 10 are through-bolted to the member 14. FIG. 9 shows the shank 20 having an interior passage 70. This interior passage 70 extends from the first end 22 to the second end 24. The interior passage 70 has an inner wall 72 defining a longitudinal axis $L_A$-$L_A$ (shown as reference numeral 74) of the support device 10. The longitudinal axis 74 extends from the first end 22 to the second end 24. The interior passage 70 is open at the first end 22 and open at the second end 24 such that a fastener (such as hex-head bolt 76) may be inserted into and through the interior passage 70.

FIG. 10 shows the support device 10 installed within the member 14. The support device 10 is shown enlarged for clarity. A passage 78 has been drilled through the member 14, and the shank 20 of the support device 10 inserts into the passage 78. The fastener (e.g., the hex-head bolt 76) inserts into and through the interior passage 70 of the support device 10 and through the passage 78 in the member 14. A nut 80 is then threaded onto a distal end 80 of the hex-head bolt 76. The support device 10 is thus through-bolted to the member 14 for supporting one or more articles (shown as reference numeral 12 in FIG. 1).

Figure 11:
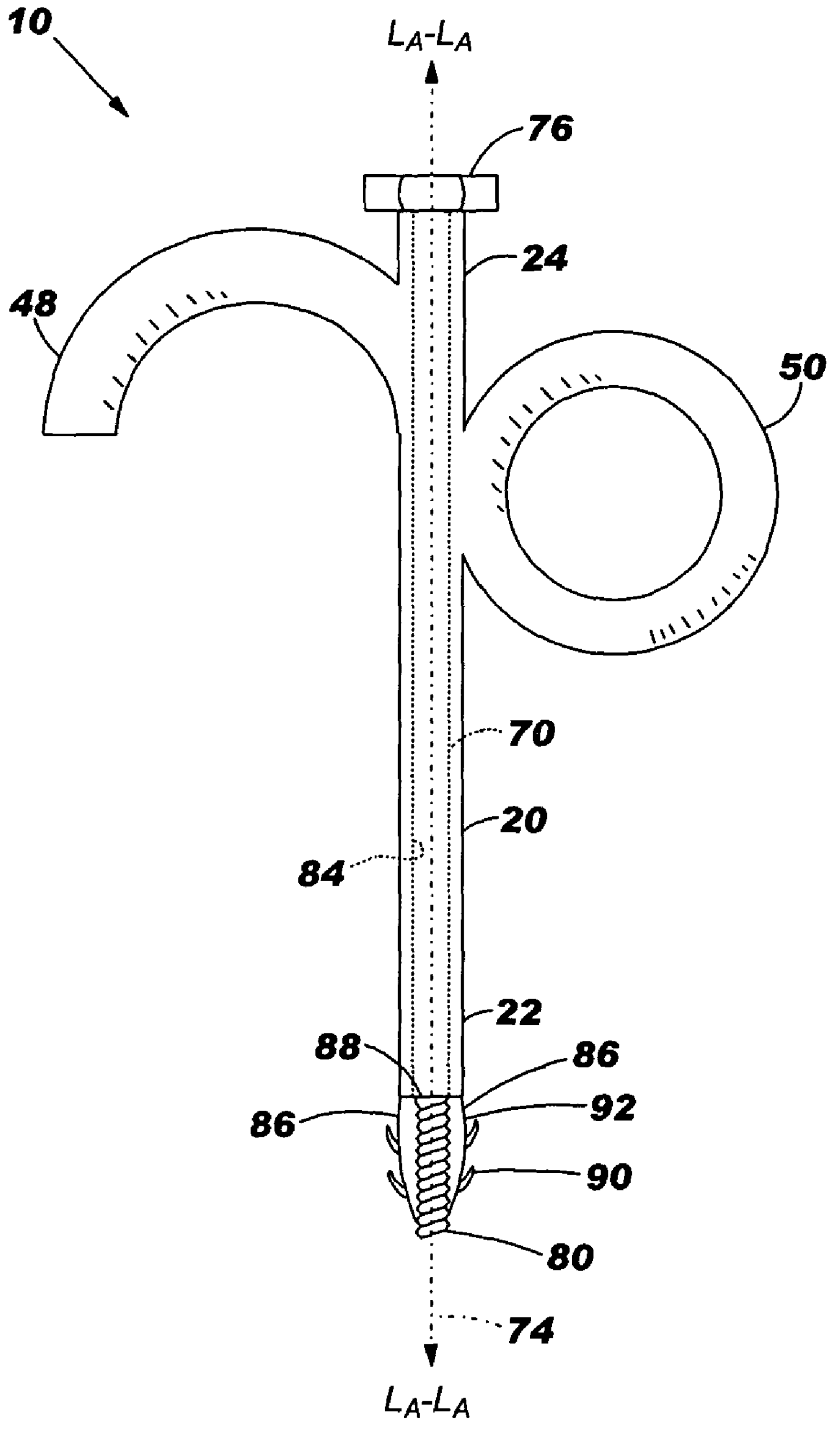
FIG. 11 is a schematic illustrating still more embodiments of the support device.

FIG. 11 is a schematic illustrating more embodiments of the support device 10. Here the interior passage 70 in the shank 20 threadably engages the hex-head bolt 76. The interior passage 70 has a threaded inner wall 84 defining the longitudinal axis $L_A$-$L_A$ (shown as reference numeral 74) of the support device 10. The shank 20 also includes at least one finger 86. The at least one finger 86 extends from the first end 22 of the shank 20. As the threaded fastener (e.g., the hex-head bolt 76) advances along the threaded interior passage 70, the threaded fastener emerges from an open end 88 in the interior passage 70. As the threaded fastener emerges from the open end 88, the distal end 80 of the hex-head bolt 76 contacts the at least one finger 86. As the threaded fastener continues advancing along the threaded interior passage 70, the distal end 80 deflects the at least one finger 86 into contact with the member (shown as reference numeral 14 in FIG. 1). The at least one finger 86 frictionally engages/grips the member to help retain the support device 10. The at least one finger 86 may even include at least one barb 90 protruding from an outer surface 92 of the at least one finger 86. The at least one barb 90 embeds into the member and helps retain the support device 10.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A support device for supporting an article, the device comprising:

a virgate shank having a first end and a second end, the first end adaptable to be driven into a member for securing the shank therein, the virgate shank having a threaded interior passage extending from the first end to the second end, the interior passage having a threaded inner wall defining a longitudinal axis extending from the first end to the second end, the interior passage open at the first end and open at the second end such that a threaded fastener may be threaded into, through, and along the interior passage, the virgate shank also including a pair of fingers extending from the first end of the shank, such that as the threaded fastener emerges from an open end in the interior passage, a distal end of the threaded fastener contacts the fingers and deflects the fingers into contact with the member, thus frictionally engaging the fingers to the member to help retain the support device, with each finger including at least one barb protruding from an outer surface of each finger, such that each barb embeds into the member to further retain the support device;

a generally hooked-shaped support member outwardly extending from an outer wall of the second end of the shank, the hook-shaped support member for supporting the article when attached to the hook-shaped support member; and a second support member outwardly extending from the outer wall of the second end of the shank, the second support member having an inner surface forming an enclosure about a hollow inner area, the second support member further supporting the article when attached to the second support member, with the shank, the hooked-shaped support member, and the second support member having a coplanar relationship.

2. A support device according to claim 1, wherein the second support member has a generally ring shape, and the inner surface has a generally circular shape enclosing the hollow inner area.

3. A support device according to claim 1, wherein the second support member has a generally square shape, and the inner surface has a generally square shape enclosing the hollow inner area.

4. A support device according to claim 1, wherein the second support member has a generally triangular shape, and the inner surface has a generally triangular shape enclosing the hollow inner area.

5. A support device according to claim 1, wherein the shank comprises a head at an extremity of the second end, the head having a polygonally-shaped surface for threadably driving the shank into the member.

6. A support device according to claim 1, wherein each finger outwardly extends along the longitudinal axis of the virgate shank, each finger having a threaded inner surface for engaging the threaded fastener as the threaded fastener emerges from the open end.

7. A support device according to claim 1, wherein the shank comprises a head at an extremity of the second end, the head having a generally flat surface for striking the shank while driving the shank into the member.

* * * * *